United States Patent
Jeong et al.

(10) Patent No.: US 7,830,621 B2
(45) Date of Patent: Nov. 9, 2010

(54) SMALL REFRACTIVE ZOOM LENS OPTICAL SYSTEM

(75) Inventors: Jae Cheol Jeong, Gwangiu (KR); Moon Hyun Kim, Gyeonggi-do (KR); Jin Hee Kang, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/071,066

(22) Filed: Feb. 14, 2008

(65) Prior Publication Data
US 2008/0204893 A1 Aug. 28, 2008

(30) Foreign Application Priority Data
Feb. 14, 2007 (KR) .................. 10-2007-0015399

(51) Int. Cl.
*G02B 9/34* (2006.01)
(52) U.S. Cl. .................................... 359/781
(58) Field of Classification Search ............. 359/432, 359/676, 684, 695, 726, 740, 708, 781
See application file for complete search history.

(56) References Cited

U.S. PATENT DOCUMENTS 7,085,070 B2 8/2006 Mihara
2001/0038496 A1* 11/2001 Yamamoto et al. .......... 359/689

FOREIGN PATENT DOCUMENTS

JP 2004-334070 11/2004

OTHER PUBLICATIONS

JP 2004-334070 (Reference AG) is also discussed on p. 1 of the current application.

* cited by examiner

*Primary Examiner*—Joseph Martinez

(57) ABSTRACT

A zoom lens optical system includes: a first lens group that is provided close to an object, has a negative refractive power in total, and includes an optical part having a surface that reflects light; a second lens group that has a negative refractive power in total; an iris; a third lens group that has a positive refractive power in total; and a fourth lens group that has a positive refractive power in total.

5 Claims, 8 Drawing Sheets

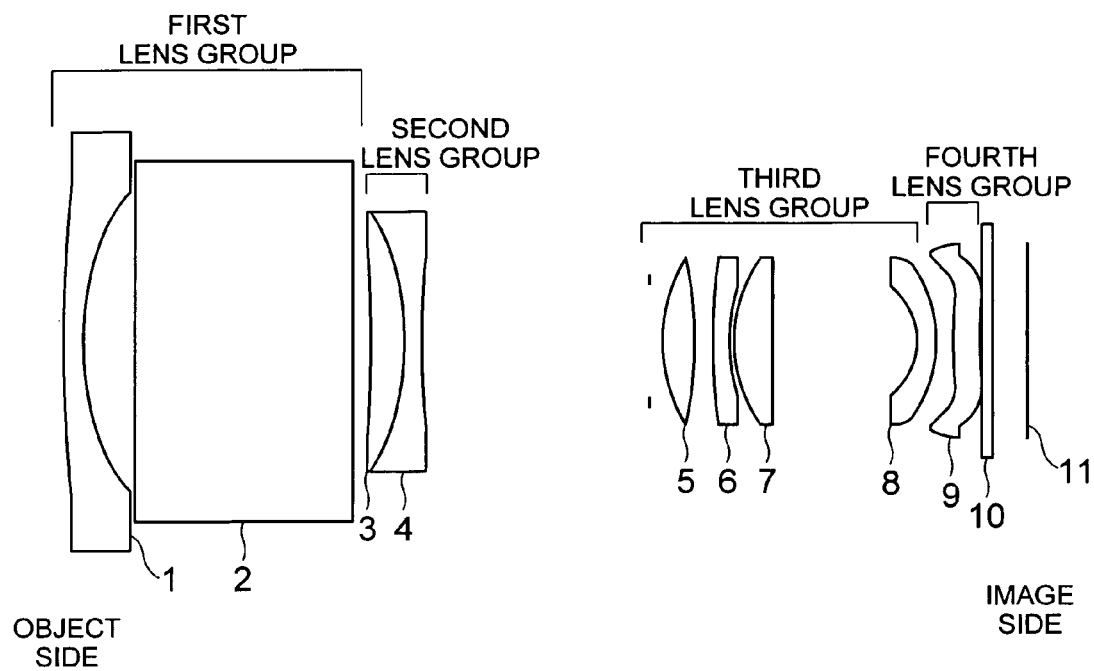
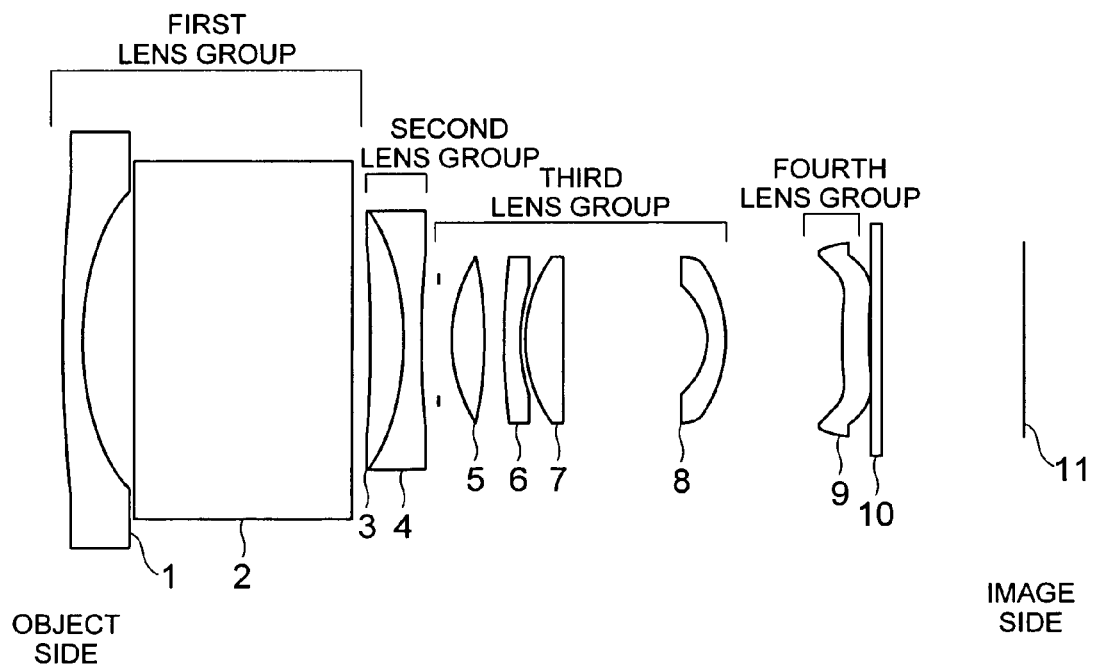

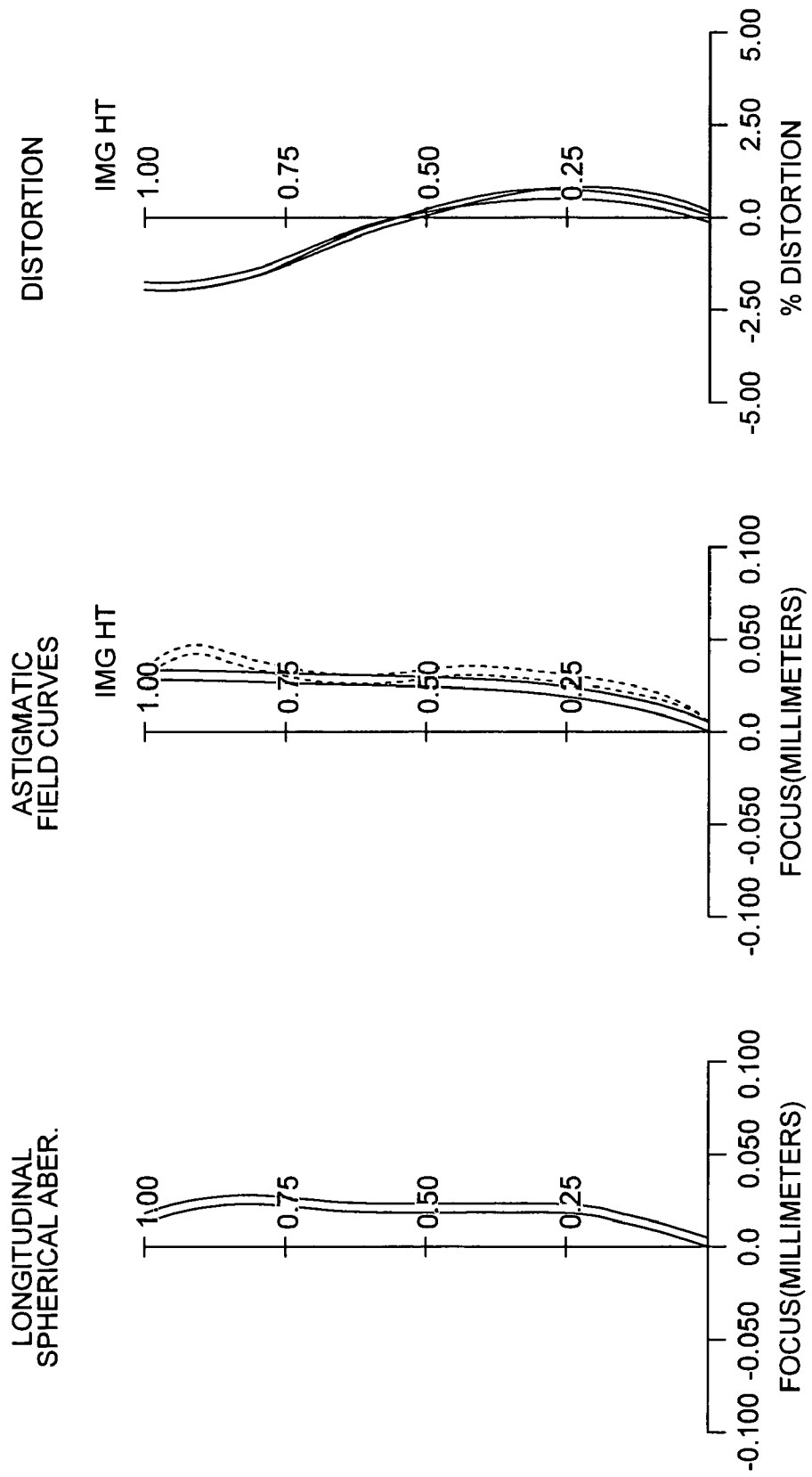
[FIG. 2A]

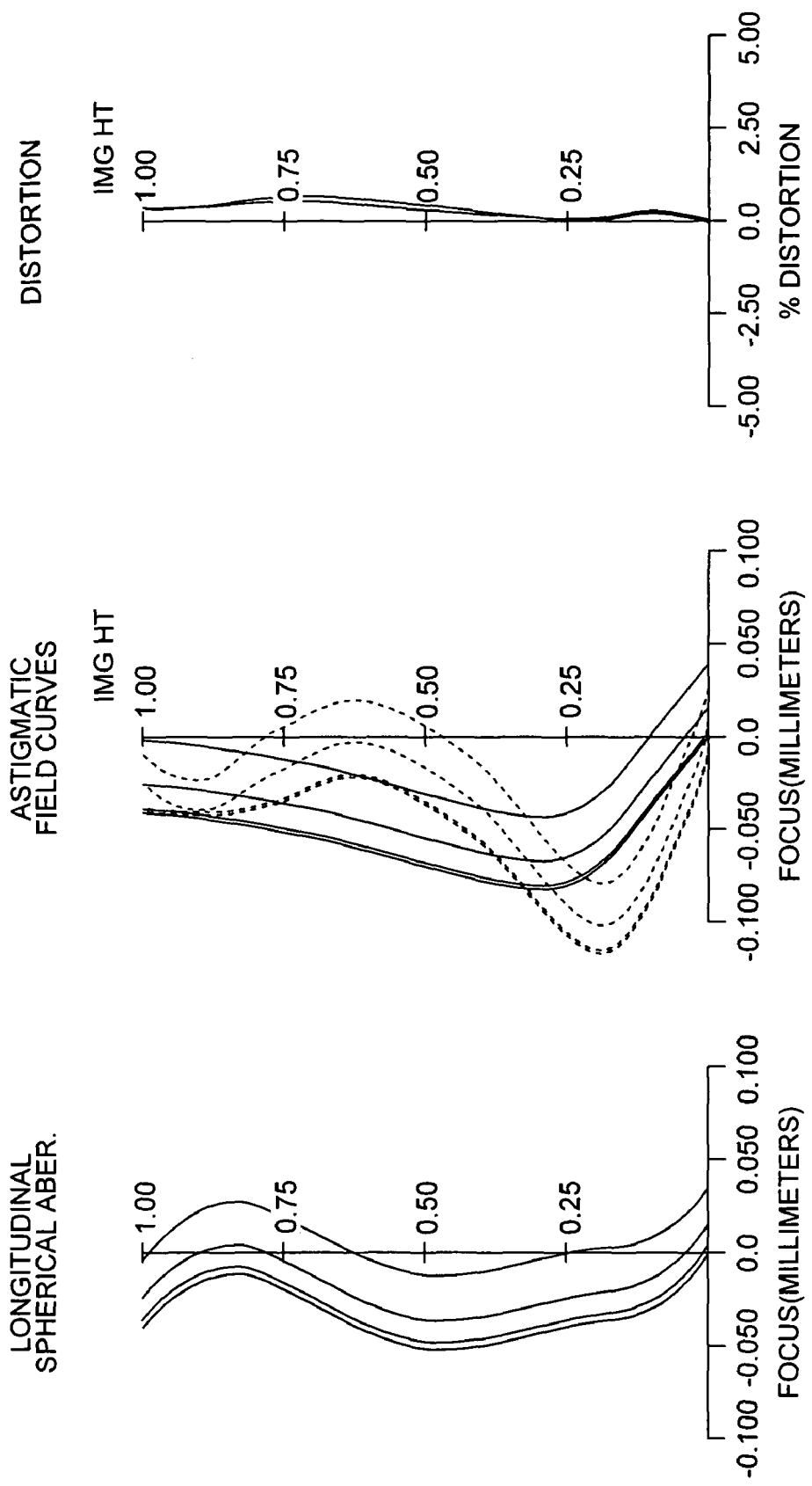
[FIG. 2B]

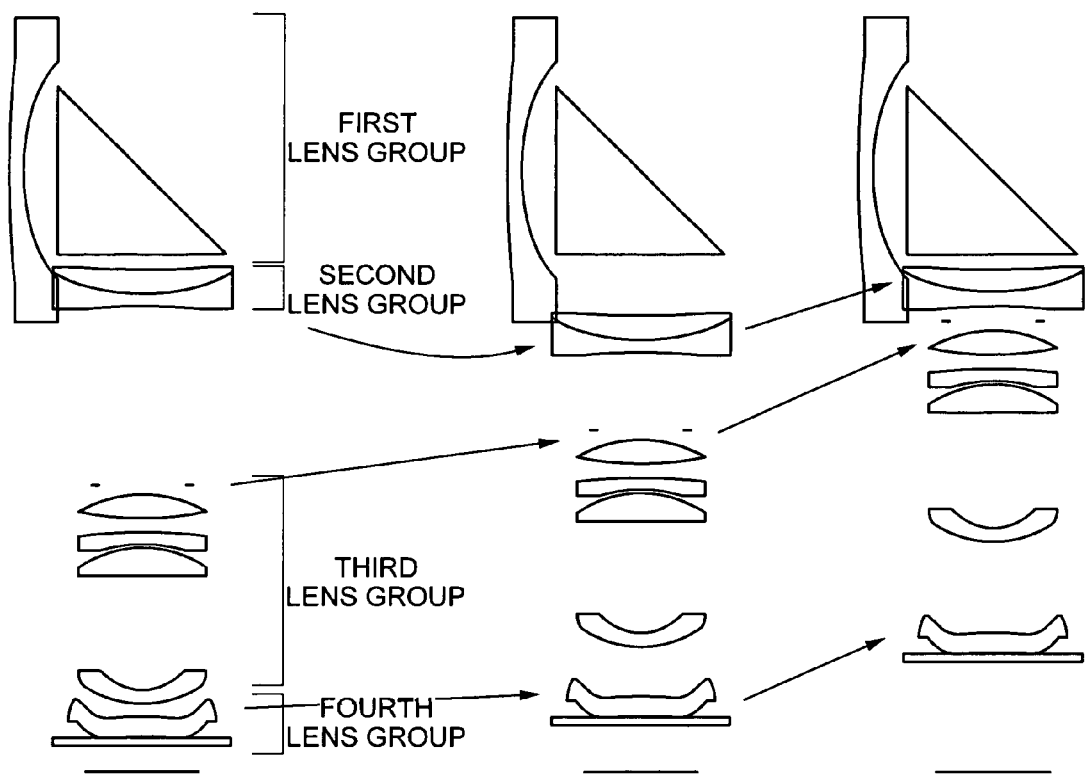
[FIG. 3]

[FIG. 4A]
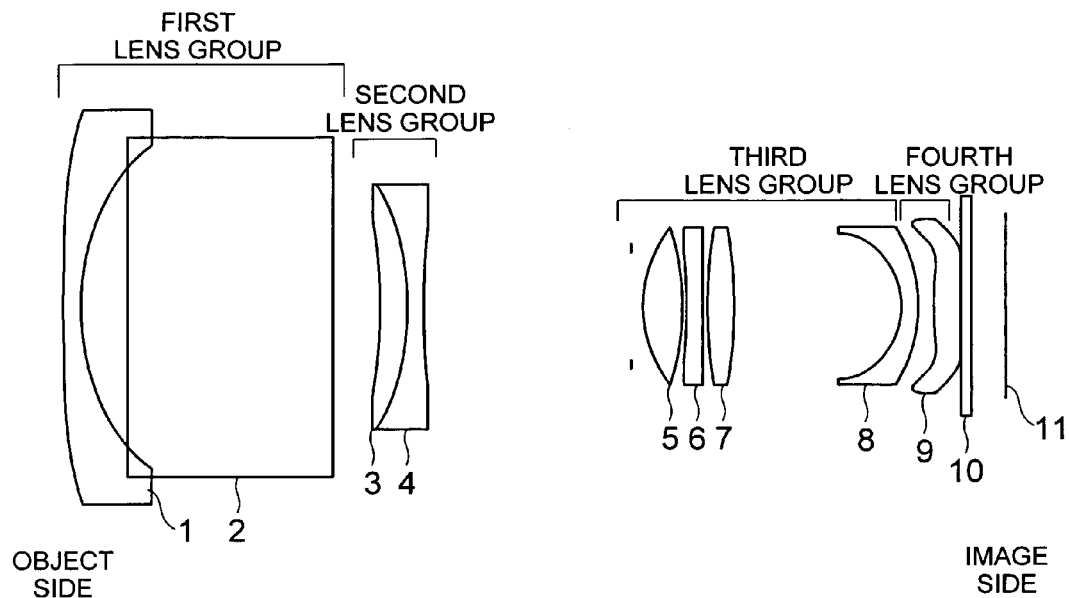
[FIG. 4B]
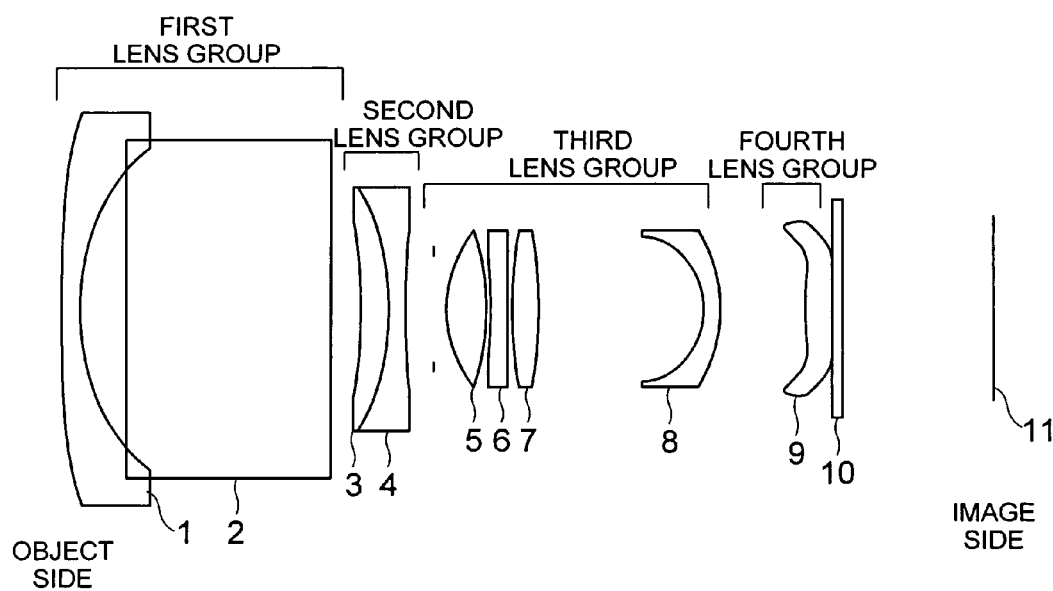

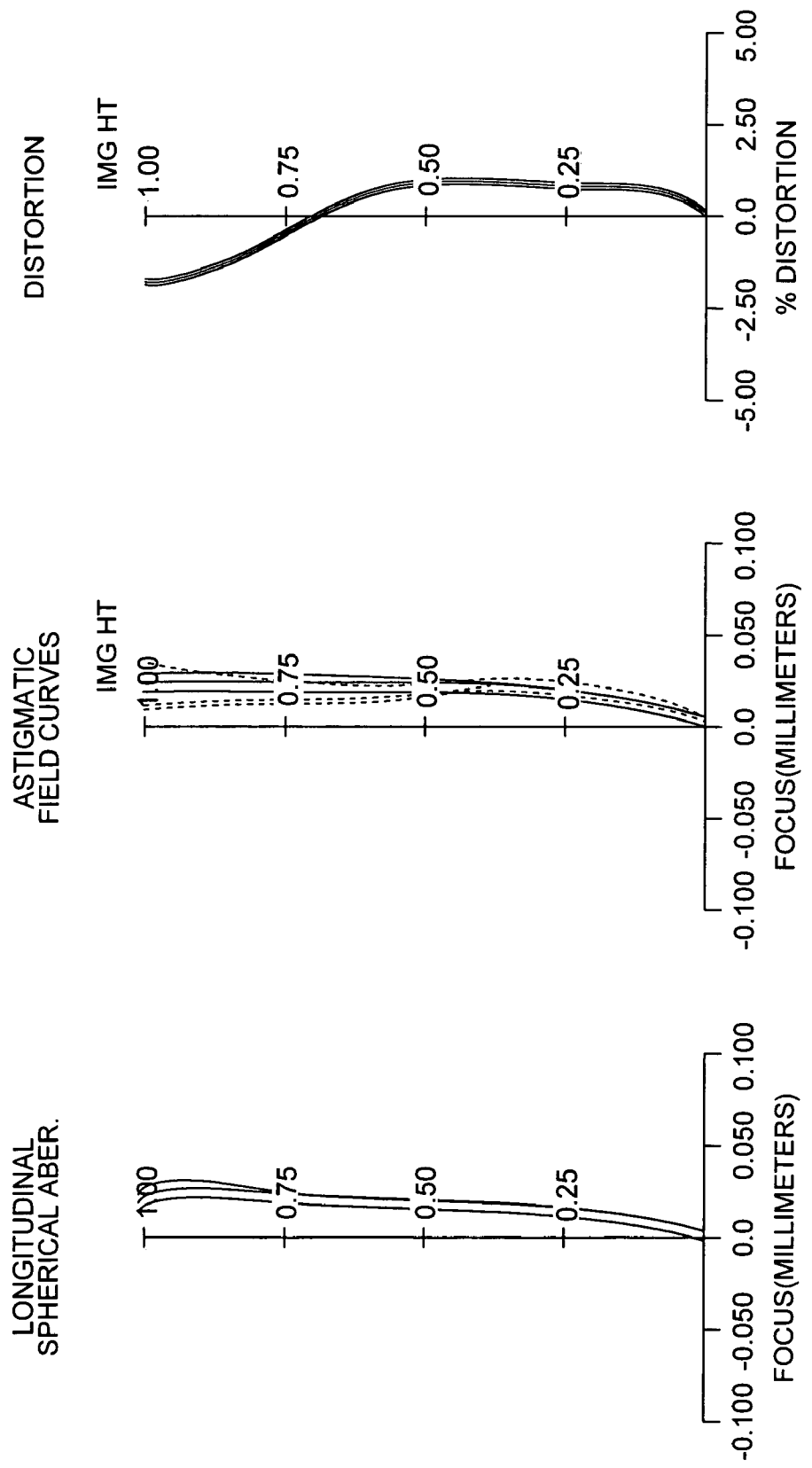
[FIG. 5A]

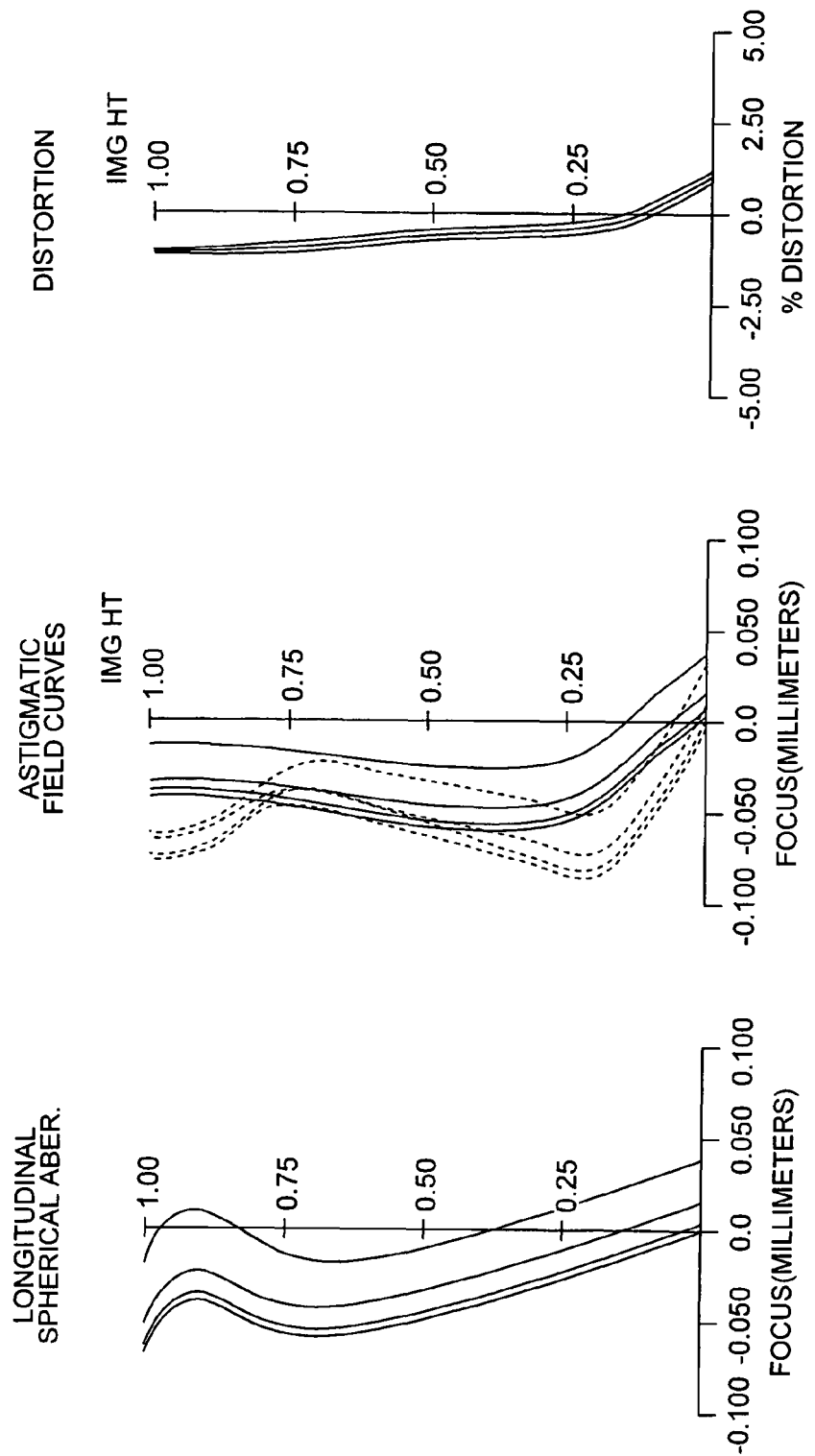
[FIG. 5B]

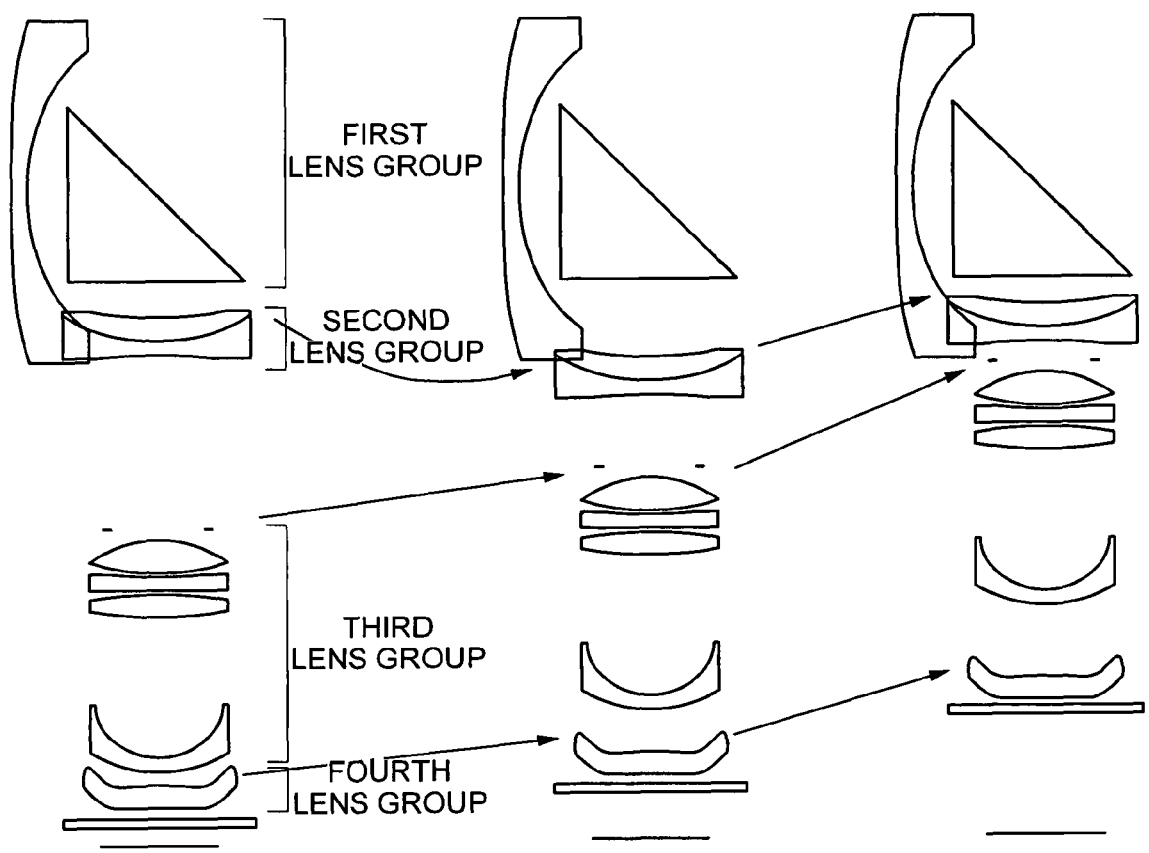
[FIG. 6]

SMALL REFRACTIVE ZOOM LENS OPTICAL SYSTEM

CROSS-REFERENCE TO RELATED APPLICATIONS

This application claims the benefit of Korean Patent Application No. 10-2007-0015399 filed with the Korea Intellectual Property Office on Feb. 14, 2007, the disclosure of which is incorporated herein by reference.

BACKGROUND OF THE INVENTION

1. Field of the Invention

The present invention relates to a small refractive zoom lens optical system applicable to a small mobile apparatus including a mobile optical system.

2. Description of the Related Art

In general, high-resolution refractive zoom lens optical systems are classified into the following two types. One has high resolution, but has a complicated structure and a large size, and the other has a small size and a simple structure, but has high resolution only at a specific distance to an object.

Such a refractive zoom lens optical system is disclosed in, for example, JP-A-2004-334070 or U.S. Pat. No. 7,085,070. The disclosed two systems have magnification that is about three times higher than that of a known refractive zoom lens. In addition, the disclosed two systems have a small size and a simplified lens structure.

However, the disclosed two systems have the following some technical problems.

First, the zoom lens optical system has a large size. When TTL is the total optical length and fw is a focal length when the optical system is at the widest angle, the disclosed two optical systems have a value of TTL/fw in the range of about 10 to 12. In recent years, however, a small size having the value of TTL/fw in the range of about 6 to 7.5 has been technically required.

Second, uniform resolution is not obtained. That is, high resolution is obtained at a specific distance to an object, but the resolution is lowered when auto focusing is performed from a short distance to a long distance.

SUMMARY OF THE INVENTION

An advantage of the present invention is that it provides a refractive zoom lens optical system that has such a high resolution as to be applicable to a mega-pixel camera, can maintain high resolution during auto focusing from a short distance to a long distance, and a sufficiently small size to obtain a value of TTL/fw in the range of about 6 to about 7.5.

Additional aspects and advantages of the present general inventive concept will be set forth in part in the description which follows and, in part, will be obvious from the description, or may be learned by practice of the general inventive concept.

According to an aspect of the invention, a zoom lens optical system includes: a first lens group that is provided close to an object, has a negative refractive power in total, and includes an optical part having a surface that reflects light; a second lens group that has a negative refractive power in total; an iris; a third lens group that has a positive refractive power in total; and a fourth lens group that has a positive refractive power in total. The second lens group, the third lens group, and the fourth lens group are moved to vary magnification, thereby obtaining a variable magnification effect. The second lens group is moved to perform focus adjustment when a distance to an object is changed between a long distance and a short distance. The distance from a first lens of the first lens group to an imaging surface is fixed even when the lens moves during a change in magnification and the focus adjustment.

Preferably, the first lens group includes at least one aspheric lens surface.

Preferably, the second lens group includes a lens having a positive refractive power and a lens having a negative refractive power.

Preferably, the fourth lens group includes one lens, and the lens includes at least one aspheric surface.

Preferably, the lens of the fourth lens group is formed of plastic.

Preferably, the zoom lens optical system satisfies the following expression:

$$1 < TTL/fw < 7,$$

(where TTL indicates the distance between an imaging surface and a portion of the first lens group closest to the object on an optical axis, and fw indicates a focal length when the zoom lens optical system is at the widest angle).

Preferably, the zoom lens optical system satisfies the following expression:

$$0 < fw/f4 < 1,$$

(where fw indicates a focal length when the zoom lens optical system is at the widest angle, and f4 indicates the total focal length of the fourth lens group).

As described above, in the zoom lens optical system according to the above-mentioned aspect of the invention, the four lens groups are arranged to have negative, negative, positive, and positive powers in total in this order. That is, the first lens group has negative power and the last lens group has positive power, thereby forming a retrofocus type structure. The retrofocus type structure reduces a CRA value, which is an incident angle of a main light beam that is incident on a sensor, and increases a back focal length (BFL), thereby simplifying a mechanical structure.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1A is a diagram illustrating the structure of an optical system according to a first embodiment of the invention in a wide mode;

FIG. 1B is a diagram illustrating the structure of the optical system according to the first embodiment of the invention in a tele mode;

FIG. 2A is a diagram illustrating the aberration of the optical system according to the first embodiment of the invention in the wide mode;

FIG. 2B is a diagram illustrating the aberration of the optical system according to the first embodiment of the invention in the tele mode;

FIG. 3 is a diagram illustrating an example of the application of a refractive optical system according to the first embodiment of the invention;

FIG. 4A is a diagram illustrating the structure of an optical system according to a second embodiment of the invention in a wide mode;

FIG. 4B is a diagram illustrating the structure of the optical system according to the second embodiment of the invention in a tele mode;

FIG. 5A is a diagram illustrating the aberration of the optical system according to the second embodiment of the invention in the wide mode;

FIG. 5B is a diagram illustrating the aberration of the optical system according to the second embodiment of the invention in the tele mode; and FIG. 6 is a diagram illustrating an example of the application of a refractive optical system according to the second embodiment of the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, the structure of zoom lens optical systems according to exemplary embodiments of the invention will be described in more detail with reference to the accompanying drawings.

First, a first lens group includes optical parts that have a negative refractive power and a function of reflecting light.

In such a structure in which the first lens group includes optical parts (for example, a prism and a reflecting mirror) having functions of reflecting light, when the first lens group has a positive refractive power, a light beam incident on a second lens group diverges, and the effective diameter of the lens increases, which results in an increase in the outside diameter of the lens. As a result, it is difficult to reduce the overall size of the lens. In addition, off-axis aberration increases, which results in the deterioration of resolution.

If the first lens group has a positive refractive power, a light beam incident on the second lens group diverges. In order to converge the diverging light beam, a third lens group should have a higher positive refractive power than the first lens group.

In this case, however, large aberration is generated, which makes it difficult to obtain high resolution. Structurally, the third lens group is a variable magnification group that changes magnifying power, and has a strong positive refractive power. Therefore, when a stronger positive refractive power is required, the power of the third lens group is excessively high, which results in large aberration.

If a reflective surface of an optical part included in the first lens group specularly reflects light, the power of the first lens group is closely connected with reflectance.

If the first lens group has a positive refractive power, an incident angle of light that is incident on the reflective surface decreases, which may cause some of the light not to be reflected from the reflective surface. Therefore, the first lens group should have a negative refractive power in order to improve the reflectance of the optical part that reflects light.

Meanwhile, the first lens group includes at least one aspheric lens surface. The reason is that, since a light beam incident on the first lens group accounts for a large area of the effective diameter of the lens, at least one aspheric lens surface makes it possible to improve an optical performance and makes it easy to reduce the overall length of the optical system.

The second lens group is an auto focusing group that has a negative refractive power and moves to adjust the focus. Since the third lens group is the variable magnification group that varies the magnifying power, the structure of the second lens group is connected with the strong positive refractive power of the third lens group.

That is, the third lens group causes the largest aberration due to its strong positive refractive power. When a focal length is changed from a long distance to a short distance, lens aberration varies. In this case, the largest variation in aberration occurs in the variable magnification group.

Therefore, the auto focusing lens group (the second lens group) needs to effectively correct the aberration of the variable magnification group (the third lens group) that causes the largest variation in aberration during the short-distance movement.

In this case, since the third lens group serving as the variable magnification group is disposed at the rear side of an iris, a large variation in aberration occurs on the rear side of the iris. Therefore, from the viewpoint of the optical design, it is most effective to vary the aberration of the front side of the iris to correct the aberration.

Therefore, it is possible to effectively correct the aberration of the variable magnification group (the third lens group) by moving forward or backward the second lens group that is disposed in front of the iris and serves as the auto focusing group. As a result, even though focus adjustment is performed from a long distance to a short distance, the resolution can be maintained.

When the second lens group is configured to include a lens having a positive refractive power and a lens having a negative refractive power, thereby forming a telephoto type, it is possible to reduce the overall length of the optical system, improve the resolution thereof, and maintain the performance thereof during auto focusing.

The third lens group is the variable magnification group having a function of varying the magnifying power and has a strong positive power. The third lens group should have a strong positive power in order to vary the magnifying power. However, when the third lens group is disposed in the vicinity of the iris, large aberration does not occur in the third lens group, and the third lens group can have high performance.

The fourth lens group has a weak positive refractive power and functions to divide the strong positive refractive power of the third lens group. In addition, from the viewpoint of a lens structure, since the fourth lens group does not have high refractive power, small aberration occurs in the fourth lens group. As shown in FIGS. 1A, 1B, 3, 4A, 4B and 6, the fourth lens group includes one lens having at least one aspheric surface with a deflection point in a top surface of the lens.

Therefore, it is sufficient to exhibit the function of the fourth lens group through only one lens. In addition, preferably, the fourth lens group includes only one lens in order to reduce the overall length of the optical system.

Further, a light beam passes through a large area of the effective diameter of the lens in the fourth lens group. Therefore, when the fourth lens group includes at least one aspheric lens surface, it is possible to improve the performance of the fourth lens group even though the overall length of the optical system is small.

Since the performance of the fourth lens group is more affected by the shape of the surface than characteristics of a material forming the lens, it is advantageous that the lens of the fourth lens group be formed of plastic. This is because the plastic material makes it possible to improve the flexibility of the shape of an aspheric lens and thus obtain high resolution.

Meanwhile, the fourth lens group should satisfy the following Expression:

$$0 < fw/f4 < 1,$$

(where fw indicates a focal length when the zoom lens optical system is at the widest angle, and f4 indicates the total focal length of the fourth lens group).

When fw/f4 is smaller than the lower limit of the above-mentioned Expression, the fourth lens group does not sufficiently exhibit its function of dividing the refractive power of the third lens group. When fw/f4 is larger than the upper limit of the above-mentioned Expression, excessively strong power is applied to the fourth lens group, which makes it difficult to correct aberration.

Meanwhile, since the zoom lens optical system according to the embodiment of the invention is applied to a small optical system, the overall length TTL should satisfy Expression given below:

$$1 < TTL/fw < 7$$

(where TTL indicates the distance between an imaging surface and a surface of the first lens group closest to an object on an optical axis, and fw indicates a focal length when the zoom lens optical system is at the widest angle).

When TTL/fw is smaller than the lower limit of the above Expression, it is difficult to ensure an optical performance and thus obtain sufficient magnifying power. On the other hand, when TTL/fw is larger than the upper limit of the above Expression, the size of the optical system becomes excessively large, which makes it difficult to apply this embodiment to a small optical system.

The following two embodiments relate to zoom lens optical systems having the above-mentioned structure.

First, reference numerals of each embodiment will be described.

The aspheric shape of the embodiment can be expressed by the following coefficients:

$$z = \frac{CR^2}{1 + \sqrt{1 - (a_1 + 1)C^2 R^2}} + a_3 R^3 + a_4 R^4 + a_5 R^5 + a_6 R^6 + a_7 R^7 + a_8 R^8 + a_9 R^9 + a_{10} R^{10},$$

$$R = \sqrt{X^2 + Y^2}, \quad C = \frac{1}{radius},$$

(where Z indicates the distance from the vertex of the lens along the optical axis, R indicates the distance in a direction perpendicular to the optical axis, C indicates an inverse number of the curvature radius at the vertex of the lens, $a_1$ is a conic constant, and $a_3$, $a_4$, $a_5$, $a_6$, $a_7$, $a_8$, $a_9$, and $a_{10}$ indicate aspheric coefficients).

In this embodiment, fw indicates a focal length when the zoom lens optical system is at the widest angle, ft indicates a focal length at a tele position, f4 indicates the total focal length of the fourth lens group, and TTL indicates the distance between the first surface of the optical system and the imaging surface on the optical axis. In addition, Y indicates the largest height, which is half the diagonal size of a sensor, R indicates the curvature radius of the lens, D indicates the thickness of the lens and an air gap, Nd indicates the refractive index of a d-line of a lens material, and vd indicates the Abbe's number of the lens material.

The following Table 1 shows the design specifications of the zoom lens optical systems having the above-mentioned structure according to the first and second embodiments.

TABLE 1

|  | First embodiment | Second embodiment |
|---|---|---|
| fw | 1.4958 | 1.5430 |
| ft | 4.2779 | 4.3209 |
| f4 | 12.6178 | 44.1843 |
| TTL | 9.8594 | 10.0715 |
| TTT/fw | 6.5914 | 6.5272 |
| fw/f4 | 0.1185 | 0.0349 |
| FNO (wide) | 3.0054 | 2.9738 |
| FNO (tele) | 5.7946 | 5.7021 |
| Y | 1 | 1 |

The following data is used to calculate the values of Table 1 in the first and second embodiments.

First Embodiment

TABLE 2

| Surface # | Surface type | R value | D value | Nd | Vd | Aperture |
|---|---|---|---|---|---|---|
|  |  | Infinity | Infinity |  |  |  |
| 1 | Aspheric surface | −4.9332 | 0.1783 | 1.5441 | 56.09 |  |
| 2 | Aspheric surface | 8.2504 | 0.5163 |  |  |  |
| 3 |  | Infinity | 2.2415 | 1.5688 | 56.04 |  |
| 4 |  | Infinity | 0.0703 |  |  |  |
| 5 |  | Infinity | 0.1117 (Z) |  |  |  |
| 6 |  | −11.9163 | 0.3569 | 1.8467 | 23.78 |  |
| 7 |  | −2.5377 | 0.1757 | 1.8350 | 42.98 |  |
| 8 |  | 11.9398 | 2.3465 (Z) |  |  |  |
| Stop |  | Infinity | 0.1054 |  |  | 0.5835 |
| 10 | Aspheric surface | 1.4762 | 0.3393 | 1.4953 | 80.94 | 0.6046 |
| 11 | Aspheric surface | −4.6289 | 0.1967 |  |  |  |
| 12 |  | 8.4064 | 0.1757 | 1.8467 | 23.78 |  |
| 13 |  | 2.5814 | 0.0442 |  |  |  |
| 14 |  | 1.5977 | 0.3819 | 1.4970 | 81.61 |  |
| 15 |  | 58.2091 | 1.4950 |  |  |  |
| 16 | Aspheric surface | −1.0022 | 0.1757 | 1.5441 | 56.09 |  |
| 17 | Aspheric surface | −3.3793 | 0.1757 (Z) |  |  |  |
| 18 | Aspheric surface | 1.4595 | 0.2599 | 1.6322 | 23.43 |  |
| 19 | Aspheric surface | 1.6632 | 0.0351 |  |  |  |
| 20 |  | Infinity | 0.0000 |  |  |  |
| 21 |  | Infinity | 0.1054 | 1.5168 | 64.20 |  |
| 22 |  | Infinity | 0.3518 (Z) |  |  |  |
| 23 |  | Infinity | 0.02 (Z) |  |  |  |

TABLE 3

|  | #1 | #2 | #10 | #11 |
|---|---|---|---|---|
| a1 | −1.000000000000E−00 | 1.000000000000E+00 | 7.139063600000E−01 | −1.000000000000E+00 |
| a3 | 2.035645148380E+02 | 1.509233883250E−02 | 1.142833970130E−02 | 1.433668349570E+02 |
| a4 | 3.780374687410E+01 | 3.376424155450E+01 | −2.134583004690E+01 | −7.716000377580E−02 |
| a5 | −5.186333476160E−01 | −5.018507025500E−01 | 7.481268216540E−01 | 2.832854793120E−01 |
| a6 | 2.431573981180E−01 | 1.657074162000E−01 | −1.823825156740E+00 | −4.715055735080E−01 |

TABLE 3-continued

|  | | | | |
|---|---|---|---|---|
| a7 | 1.839435823890E−02 | 1.288075803750E−01 | 2.125212381200E+00 | 4.433161227240E−01 |
| a8 | −6.955569887810E−02 | −1.475197470340E−01 | −1.023063781390E+00 | −2.235863140840E−01 |
| a9 | 2.807216388890E−02 | 5.783190633020E−02 | 0.000000000000E+00 | −5.379013682970E−04 |
| a10 | −3.656310351720E−03 | −8.593424250990E+03 | 0.000000000000E+00 | 4.795682746860E−06 |

|  | #16 | #17 | #18 | #19 |
|---|---|---|---|---|
| a1 | 5.000000000000E−01 | −1.000000000000E+00 | 8.500000000000E−01 | −1.000000000000E+00 |
| a3 | −4.018571572630E−02 | −4.414832837720E−01 | −1.715463773980E+00 | −1.707113573050E+00 |
| a4 | −1.769083296520E+00 | 1.533661738230E+00 | 1.152011260400E+01 | 1.123439331030E+01 |
| a5 | 1.330723105270E+01 | −5.690236050530E+00 | −5.125534989860E+01 | −4.684376676710E+01 |
| a6 | −9.173253470850E+01 | −5.414857918420E+01 | 1.341528739090E+02 | 1.125081401830E+02 |
| a7 | 3.523804190401E+02 | 7.937534477210E+01 | −2.238813234560E−02 | −1.647750616420E+02 |
| a8 | −7.938034299550E+02 | −2.013457310510E+02 | 2.357466901560E+02 | 1.448032326770E+02 |
| a9 | 8.781368006160E+02 | 2.166184123730E+02 | −1.458390699590E+02 | −7.077131435600E+01 |
| a10 | −3.855848012750E+02 | −8.693242545370E+01 | 4.073916780380E+01 | 1.491622206200E+01 |

TABLE 4

|  | WIDE | | TELE | |
|---|---|---|---|---|
|  | INFINITY | 350 | INFINITY | 350 |
| # 5 | 0.1117 | 0.0853 | 0.1152 | 0.0888 |
| # 8 | 2.3465 | 2.3729 | 0.2315 | 0.2580 |
| # 17 | 0.1757 | 0.1757 | 1.1953 | 1.1953 |
| # 22 | 0.3518 | 0.3518 | 1.4888 | 1.4888 |
| # 23 | 0.0200 | 0.0200 | −0.0250 | −0.0250 |

Table 2 shows R, D, Nd, and vd values of the lenses forming the zoom lens optical system according to the first embodiment, Table 3 shows aspheric surface coefficients according to the first embodiment, and Table 4 shows distance data for each zoom position.

Second Embodiment

TABLE 5

| Surface # | Surface type | R value | D value | Nd | Vd | Aperture |
|---|---|---|---|---|---|---|
|  |  | Infinity | Infinity |  |  |  |
| 1 | Aspheric surface | −8.3734 | 0.1786 | 1.5441 | 56.09 |  |
| 2 | Aspheric surface | 5.1224 | 0.5172 |  |  |  |

TABLE 5-continued

| Surface # | Surface type | R value | D value | Nd | Vd | Aperture |
|---|---|---|---|---|---|---|
| 3 |  | Infinity | 2.2152 | 1.8340 | 37.35 |  |
| 4 |  | Infinity | 0.0714 |  |  |  |
| 5 |  | Infinity | 0.4161 (Z) |  |  |  |
| 6 |  | −5.6351 | 0.3011 | 1.8467 | 23.78 |  |
| 7 |  | −2.5335 | 0.1786 | 1.7130 | 53.94 |  |
| 8 |  | 11.7890 | 2.1866 (Z) |  |  |  |
| Stop |  | Infinity | 0.1203 |  |  | 0.6071 |
| 10 | Aspheric surface | 1.3749 | 0.4344 | 1.4953 | 80.94 | 0.6357 |
| 11 | Aspheric surface | −2.7550 | 0.0357 |  |  |  |
| 12 |  | −5.8440 | 0.1786 | 1.8467 | 23.78 |  |
| 13 |  | 17.1641 | 0.0357 |  |  |  |
| 14 |  | 4.3462 | 0.2908 | 1.4970 | 81.61 |  |
| 15 |  | −8.5433 | 1.7897 |  |  |  |
| 16 | Aspheric surface | −0.9664 | 0.1786 | 1.5441 | 56.09 |  |
| 17 | Aspheric surface | −2.4029 | 0.1739 (Z) |  |  |  |
| 18 | Aspheric surface | 1.6054 | 0.2857 | 1.5441 | 56.09 |  |
| 19 | Aspheric surface | 1.6124 | 0.0000 |  |  |  |
| 20 |  | Infinity | 0.0000 |  |  |  |
| 21 |  | Infinity | 0.1071 | 1.5168 | 64.20 |  |
| 22 |  | Infinity | 0.3571 (Z) |  |  |  |
| 23 |  | Infinity | 0.0189 (Z) |  |  |  |

TABLE 6

|  | #1 | #2 | #10 | #11 |
|---|---|---|---|---|
| a1 | 1.500000000000E+00 | −5.000000000000E+00 | −4.558805600000E−01 | −2.000000000000+00 |
| a3 | −4.889706461500E−00 | −6.339288529670E−02 | 5.882515397310E−03 | 9.998497048000E−03 |
| a4 | 4.505117039260E+01 | 5.142043876800E+01 | −1.220028126600E−01 | −1.437072465730E−01 |
| a5 | −6.560399050430E−01 | −5.893467398020E−01 | 5.624244210140E−01 | 3.878109461050E−01 |
| a6 | 2.323815863910E−01 | 1.843091526820E−01 | −1.375261380140E+00 | −2.669745504030E+00 |
| a7 | 2.935337278020E−02 | 1.251527399230E−01 | 1.542646264370E+00 | 3.294838510390E+00 |
| a8 | −6.156083528920E−02 | −1.345313322580E−01 | −6.647070370810E−01 | −1.553213373160E+00 |
| a9 | 2.724549018560E−03 | 4.963853317290E−02 | 0.000000000000E+00 | −4.734377230690E−04 |
| a10 | −2.879971537730E−03 | −6.584335684650E−03 | 0.000000000000E+00 | 4.154612002640E−05 |

|  | #16 | #17 | #18 | #19 |
|---|---|---|---|---|
| a1 | 4.494171500000E−00 | −5.000000000000E+00 | 8.999339800000E−01 | −2.000000000000+00 |
| a3 | −3.691928444580E−01 | −5.967459533890E+01 | −1.450886418380E+00 | −1.594000165260E+00 |
| a4 | 1.807416957120E+00 | 2.671409560650E+00 | 9.721849104150E+00 | 9.839921887650E+00 |
| a5 | 5.892352424320E+00 | −7.315634494390E+00 | −4.667249084050E+01 | −4.285582692880E+01 |

TABLE 6-continued

| a6 | −8.433100300830E+01 | −5.072292160290E+00 | 1.237298148310E+02 | 1.040143391520E+02 |
| a7 | 3.497842730860E+02 | 7.751392281600E+01 | −2.021197295440E+02 | −1.507142502990E+02 |
| a8 | −7.132187297990E+02 | −1.779525408210E+02 | 2.093385162080E+02 | 1.236527820300E+02 |
| a9 | 1.256158933280E+02 | 1.786517736690E+02 | −1.370182051060E+02 | −5.249253869550E+01 |
| a10 | −2.943254800540E+02 | −6.596578890290E+01 | 4.019345180090E+01 | 1.992802232480E+01 |

TABLE 7

| | WIDE | | TELE | |
| --- | --- | --- | --- | --- |
| | INFINITY | 357 | INFINITY | 357 |
| # 5 | 0.4161 | 0.3939 | 0.2796 | 0.2571 |
| # 8 | 2.1866 | 2.2089 | 0.3086 | 0.3311 |
| # 17 | 0.1739 | 0.1739 | 0.9439 | 0.9439 |
| # 22 | 0.3571 | 0.3571 | 1.6647 | 1.6652 |
| # 23 | 0.0189 | 0.0189 | −0.0443 | −0.0446 |

Table 5 shows R, D, Nd, and vd values of the lenses forming the zoom lens optical system according to the second embodiment, Table 6 shows aspheric surface coefficients according to the second embodiment, and Table 7 shows distance data for each zoom position.

Meanwhile, the shape of the optical system according to the first embodiment is shown in FIGS. 1A and 1B, and specifically, the optical system may have the shape shown in FIG. 3. The shape of the optical system according to the second embodiment is shown in FIGS. 4A and 4B, and specifically, the optical system may have the shape shown in FIG. 6.

FIGS. 1A and 4A show the shapes of the optical systems according to the first and second embodiments in a wide mode, respectively, and FIGS. 1B and 4B show the shapes of the optical systems according to the first and second embodiments in a tele mode, respectively.

FIGS. 2A and 2B are diagrams illustrating the aberration of the optical system according to the first embodiment in the wide mode and the tele mode, respectively, and FIGS. 5A and 5B are diagrams illustrating the aberration of the optical system according to the second embodiment in the wide mode and the tele mode, respectively.

According to the invention, the refractive zoom lens applicable to a small apparatus, such as a mobile apparatus, can maintain high resolution during an AF operation from a long distance to a short distance, even when the size of the lens is small and the number of lenses is small. In addition, it is possible to further reduce the size of the lens, as compared to the related art.

Specifically, the second lens group that effectively corrects the aberration of the variable magnification group having a strong refractive power is composed of an auto focusing group. Therefore, during auto focusing from a short distance to a long distance, it is possible to maintain high resolution. In addition, it is possible to maintain high resolution and reduce the overall length of the optical system by arranging the second lens group in a telephoto type.

Further, each of the first lens group and the fourth lens group having a large effective area for light beams includes at least one aspheric lens surface. Therefore, it is possible to maintain high resolution and reduce the overall length of the optical system.

Furthermore, the fourth lens group is configured to have a weak positive power. Therefore, it is possible to divide the strong refractive power of the variable magnification group (the third lens group) and thus improve the resolution of an optical system. In addition, since the fourth lens group includes a single lens formed of plastic, it is possible to improve the flexibility of the design and thus achieve an optical system having a high performance and a small size.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A zoom lens optical system comprising:
   a first lens group that has a negative refractive power in total and includes an optical part having a surface which reflects light;
   a second lens group that has a negative refractive power in total;
   an iris;
   a third lens group that has a positive refractive power in total; and
   a fourth lens group that has a positive refractive power in total,
   wherein the first lens group, the second lens group, the iris, and the third lens group are sequentially arranged from an object side,
   the second lens group, the third lens group, and the fourth lens group are moved to vary magnification, thereby obtaining a variable magnification effect,
   the second lens group is moved to perform focus adjustment when a distance to an object is changed between a long distance and a short distance,
   the distance from a first lens of the first lens group to an imaging surface is fixed even when the lens moves during a change in magnification and the focus adjustment, and
   the zoom lens optical system satisfies the following expression $1 < TTL/fw < 7$, where TTL indicates the distance between the imaging surface and the surface of the first lens group closest to the object on an optical axis, and fw indicates a focal length when the zoom lens optical system is at the widest angle.

2. The zoom lens optical system according to claim 1, wherein the first lens group includes at least one aspheric lens surface.

3. The zoom lens optical system according to claim 1, wherein the second lens group includes a lens having a positive refractive power and a lens having a negative refractive power.

4. The zoom lens optical system according to claim 1, wherein the zoom lens optical system satisfies the following expression:

$0 < fw/f4 < 1$, where fw indicates a focal length when the zoom lens optical system is at the widest angle, and f4 indicates the total focal length of the fourth lens group.

5. A zoom lens optical system comprising:
a first lens group that has a negative refractive power in total and includes an optical part having a surface which reflects light;
a second lens group that has a negative refractive power in total;
an iris;
a third lens group that has a positive refractive power in total; and
a fourth lens group that has a positive refractive power in total,
the first lens group, the second lens group, the iris, and the third lens group being sequentially arranged from an object side, and
the fourth lens group including one lens having at least one aspheric surface with a deflection point in a top surface of the lens, the lens of the fourth lens group being formed of plastic.

* * * * *

UNITED STATES PATENT AND TRADEMARK OFFICE
CERTIFICATE OF CORRECTION

| | |
|---|---|
| PATENT NO. | : 7,830,621 B2 |
| APPLICATION NO. | : 12/071066 |
| DATED | : November 9, 2010 |
| INVENTOR(S) | : Jae Cheol Jeong et al. |

It is certified that error appears in the above-identified patent and that said Letters Patent is hereby corrected as shown below:

Title Page, Item (75) Inventor, Line 1 delete "Gwangiu (KR);" and insert -- Gwangju (KR) --, therefor.

Signed and Sealed this
Nineteenth Day of April, 2011

David J. Kappos
*Director of the United States Patent and Trademark Office*